US011416633B2

(12) United States Patent
Schmatz et al.

(10) Patent No.: US 11,416,633 B2
(45) Date of Patent: Aug. 16, 2022

(54) SECURE, MULTI-LEVEL ACCESS TO OBFUSCATED DATA FOR ANALYTICS

(71) Applicant: International Business Machines Corporation, Armonk, NY (US)

(72) Inventors: Martin Schmatz, Rueschlikon (CH); Navaneeth Rameshan, Zurich (CH); Patricia M. Sagmeister, Adliswil (CH); Yiyu Chen, Thalwil (CH); Mitch Gusat, Langnau (CH)

(73) Assignee: International Business Machines Corporation, Armonk, NY (US)

( * ) Notice: Subject to any disclaimer, the term of this patent is extended or adjusted under 35 U.S.C. 154(b) by 800 days.

(21) Appl. No.: 16/278,028

(22) Filed: Feb. 15, 2019

(65) Prior Publication Data

US 2020/0265159 A1 Aug. 20, 2020

(51) Int. Cl.
*G06F 21/62* (2013.01)
*H04L 9/08* (2006.01)

(52) U.S. Cl.
CPC .......... *G06F 21/6245* (2013.01); *H04L 9/088* (2013.01); *H04L 2209/16* (2013.01)

(58) Field of Classification Search
CPC ................. G06F 21/53; G06F 21/6245; G06F 2221/2125; H04L 63/06; H04L 63/102; H04L 2463/062; H04L 9/0822; H04L 9/088; H04L 9/0894
See application file for complete search history.

(56) References Cited

U.S. PATENT DOCUMENTS

| | | | | |
|---|---|---|---|---|
| 8,543,821 | B1 | 9/2013 | Gabrielson | |
| 9,584,517 | B1 * | 2/2017 | Roth | G06F 21/6209 |
| 10,055,601 | B1 * | 8/2018 | Hamid | H04L 9/0819 |
| 10,803,197 | B1 * | 10/2020 | Liao | G06F 21/604 |
| 2004/0199517 | A1 * | 10/2004 | Casati | G06F 16/283 |
| 2007/0112869 | A1 * | 5/2007 | Gadiraju | G06F 16/21 |
| 2009/0144829 | A1 * | 6/2009 | Grigsby | G06F 21/6263 726/26 |

(Continued)

FOREIGN PATENT DOCUMENTS

| | | | |
|---|---|---|---|
| CN | 104679781 | A | 6/2015 |
| CN | 106611129 | A | 5/2017 |
| EP | 3704619 | A1 | 5/2019 |

OTHER PUBLICATIONS

Zi-Iou,Yanan, PRC(ISA/CN) as ISA, Patent Cooperation Treaty International Search Report, PCT/1B2020/051074, dated May 27, 2020, 6 pages.

(Continued)

*Primary Examiner* — Eric W Shepperd
(74) *Attorney, Agent, or Firm* — Daniel Morris; Otterstedt & Kammer PLLC

(57) ABSTRACT

In a computer-implemented method for providing obfuscated data to users, first, a user request to access data is received; then, an authorization level associated with the request received is identified. Next, obfuscated data is accessed in a protected enclave, which data corresponds to the request received. The data accessed has been obfuscated with an obfuscation algorithm that yields a level of obfuscation compatible with the authorization level identified. Finally, the obfuscated data accessed is provided to the user, from the protected enclave. Related systems and computer program products are also disclosed.

17 Claims, 3 Drawing Sheets

(56) References Cited

U.S. PATENT DOCUMENTS

| | | | | |
|---|---|---|---|---|
| 2010/0161984 | A1* | 6/2010 | Pauker | H04L 9/3073 713/168 |
| 2011/0154061 | A1* | 6/2011 | Chilukuri | G06F 12/1408 713/193 |
| 2011/0277037 | A1* | 11/2011 | Burke | G06F 21/60 726/26 |
| 2011/0282862 | A1* | 11/2011 | Loeb | G06F 21/6245 707/710 |
| 2015/0213226 | A1* | 7/2015 | Wolniewicz | G16Z 99/00 705/3 |
| 2015/0379303 | A1 | 12/2015 | LaFever et al. | |
| 2016/0085996 | A1 | 3/2016 | Eigner et al. | |
| 2016/0283731 | A1* | 9/2016 | Chow | G06F 21/57 |
| 2016/0381054 | A1* | 12/2016 | Agaian | H04L 63/1408 726/23 |
| 2017/0124258 | A1 | 5/2017 | Fritsch et al. | |
| 2017/0132186 | A1 | 5/2017 | Plummer | |
| 2017/0222992 | A1* | 8/2017 | Adler | H04L 9/0841 |
| 2018/0060612 | A1 | 3/2018 | Gladwin et al. | |
| 2018/0248887 | A1* | 8/2018 | Sayed | H04L 63/0428 |
| 2019/0121998 | A1* | 4/2019 | VanderLeest | G06F 21/602 |
| 2020/0036732 | A1* | 1/2020 | Grubel | H04L 63/0227 |
| 2020/0174990 | A1* | 6/2020 | Pratkanis | H04L 9/0637 |
| 2020/0193057 | A1* | 6/2020 | Yu | G06F 21/6245 |
| 2020/0327252 | A1* | 10/2020 | McFall | G06F 21/78 |

OTHER PUBLICATIONS

Zi-Iou,Yanan, PRC(ISA/CN) as ISA, Patent Cooperation Treaty Written Opinion, PCT/1B2020/051074, dated May 27, 2020, 4 pages.

Patents Act 1977: Examination Report under Section 18(3), Counterpart British Application GB2111724.7, dated Jun. 29, 2022, 7 pages.

* cited by examiner

SECURE, MULTI-LEVEL ACCESS TO OBFUSCATED DATA FOR ANALYTICS

BACKGROUND

The invention relates in general to the field of a computer-implemented methods and systems for providing obfuscated data to users, e.g., to perform analytics based on such data. In particular, it is directed to methods relying on obfuscation algorithms that yield levels of obfuscation that are compatible with authorization levels of users requesting such data.

Analytics relate to the systematic computational analysis of data and notably comprise the acquisition and interpretation of patterns hidden in data. Analytics on data can thus create value out of data. Companies may for instance apply analytics to data to understand such patterns and predict business trends and/or improve business performance.

However, issues related to data ownership, privacy, regulatory needs, and discrimination limit the actual possibilities for analytics. For example, there are numerous privacy concerns, originating from privacy law (general data protection regulation), trade secrets, confidential information, etc. As a result, only a small fraction of data is available for analytics, which must be handled with care.

SUMMARY

According to a first aspect, the present invention is embodied as a computer-implemented method for providing obfuscated data to users. First, a user request to access data is received. An authorization level associated with the request received is identified. Next, obfuscated data corresponding to the request received are accessed in a protected enclave. The data accessed are data that have been obfuscated with an obfuscation algorithm that yields a level of obfuscation compatible with the authorization level identified. Finally, the obfuscated data accessed are provided to the user, from the protected enclave.

After obfuscated data have been provided to the user, the latter shall typically perform analytics (or other cognitive operations), based on the obfuscated data.

In the present approach, all sensitive operations (starting with the obfuscation) are performed in a protected enclave. This way, security can be maintained in an ecosystem where numerous users may interact with a vast amount of data subject to various access rights. The present approach makes it possible to allow users to perform analytics based on data massively available, e.g., in a data lake, while preserving data usage authorizations (e.g., as stipulated by the data owners) and complying with other potential requirements (legal, regulatory, contractual, etc.). As a result, different users may possibly get access to the same data, but with different obfuscation levels. Such levels institute intermediate levels of accessibility between publicly available data and fully private data.

In embodiments, the method further comprises, prior to providing the obfuscated data, encrypting the obfuscated data accessed with a user key, in the protected enclave. The user key is eventually provided to the user, in addition to the encrypted obfuscated data. This way, all data leaving the protected enclave is encrypted (for security reasons), except the user key; the user can decrypt the encrypted data provided using this user key.

Preferably, the method further comprises providing (from the protected enclave) an encrypted version of the user key to the user, in addition to a plain version thereof. Later on, the user may nevertheless still request receiving the user key again (in plain form), if necessary, by providing the encrypted version of the key to the system.

In preferred embodiments, the protected enclave is in data communication with a key management system and the method further comprises generating, at said key management system, the user key used to subsequently encrypt the obfuscated data.

Preferably, the protected enclave is in data communication with a first database storing non-obfuscated data, in encrypted form. In that case, obfuscated data are accessed as follows (again, in the protected enclave). First, encrypted data are obtained from the first database, which data are not obfuscated yet. The data obtained from the first database are data that correspond to data as requested in the request received. Then, the encrypted data obtained from the first database are decrypted. The decrypted data are finally obfuscated using said obfuscation algorithm. I.e., data are obfuscated on demand, from data arising from a secure storage.

In embodiments, the method further comprises continually encrypting data, in a protected enclave, and continually storing the resulting encrypted data on the first database. Preferably, the first database is configured as a data lake.

In preferred embodiments, the protected enclave is in data communication with a second database, which stores obfuscated data, in encrypted form. Access to the obfuscated data may then comprise checking whether the data as requested in the request received are already available in the second database. If so, then the encrypted (and obfuscated) data, which correspond to the requested data, are obtained from the second database. The encrypted, obfuscated data obtained are then decrypted, so as to be able to subsequently provide the decrypted obfuscated data to the user. As noted above, the data provided will preferably be re-encrypted (prior to being exported), albeit with a different key. Else, if the data requested are not already available in the second database, then encrypted data corresponding to requested data are obtained from the first database, as described above.

Preferably, the method further comprises encrypting, in the protected enclave, the obfuscated data with a management key, and storing the accordingly encrypted, obfuscated data on the second database. Thus, the second database is effectively used as a cache, to improve efficiency of the system.

As noted earlier, the protected enclave may be in data communication with a key management system. Thus, the method shall preferably further comprise generating, at said key management system, the management key used to encrypt the obfuscated data.

In embodiments, the request received specifies a given level of obfuscation. In that case, the obfuscated data are accessed only if said given level of obfuscation is compatible with the authorization level identified.

In variants, the request may specify a goal to be achieved with data referred to in the request. In this case, the obfuscated data accessed are data obfuscated with an obfuscation algorithm selected in accordance with said goal, provided that the resulting level of obfuscation is compatible with the authorization level identified.

In other variants, the request may specify an obfuscation algorithm. If so, the obfuscated data are obfuscated with the obfuscation algorithm specified, but the method further comprises selecting a level of obfuscation produced by this algorithm, so as for this obfuscation level to be compatible with the authorization level identified.

All such variants (i.e., specifying a given level of obfuscation, a goal or the obfuscation algorithm itself) may possibly be proposed as options in the user interface.

Various obfuscation algorithms can be contemplated. For example, the obfuscation algorithm may rely on one or more of the following: naive anonymization, K-anonymity, differential privacy, homomorphic-encryption, data aggregation, and data sampling.

According to another aspect, the invention is embodied as a computerized system. The system comprises a request processing module and a protected enclave, e.g., each provided in a server. Consistently with the present methods, the request processing module is configured to receive a user request to access data and identify an authorization level associated with a user request received. Moreover, this module is adapted to obfuscate data (via the protected enclave) with one or more obfuscation algorithms, the latter yielding different levels of obfuscation. In addition, this module is designed to access obfuscated data corresponding to user requests, wherein the data are obfuscated with one or more of the obfuscation algorithms, so as to yield a level of obfuscation that is compatible with an authorization level identified upon receiving a request. Finally, this module may, in response to user requests, provide obfuscated data accessed via the protected enclave.

Preferably, the request processing module is further configured to encrypt, in the protected enclave, obfuscated data it accesses with a user key, and provide, in response to a user request, such a user key to the user in addition to encrypted obfuscated data.

In embodiments, the system further comprises a key management system adapted to generate such a user key. It may else be in data communication with such a key management system.

Preferably, the system further comprises a first database storing non-obfuscated data, in encrypted form, and a second database storing obfuscated data, in encrypted form, as discussed earlier.

According to a final aspect, the invention is embodied as a computer program product for providing obfuscated data to users. The computer program product comprises a computer readable storage medium having program instructions embodied therewith. The program instructions are executable by one or more processors, to cause to implement steps according to the present methods.

Computerized systems, methods, and computer program products embodying the present invention will now be described, by way of non-limiting examples, and in reference to the accompanying drawings.

BRIEF DESCRIPTION OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which.

The accompanying drawings show simplified representations of devices or parts thereof, as involved in embodiments. Similar or functionally similar elements in the figures have been allocated the same numeral references, unless otherwise indicated.

DETAILED DESCRIPTION

Figure 1:
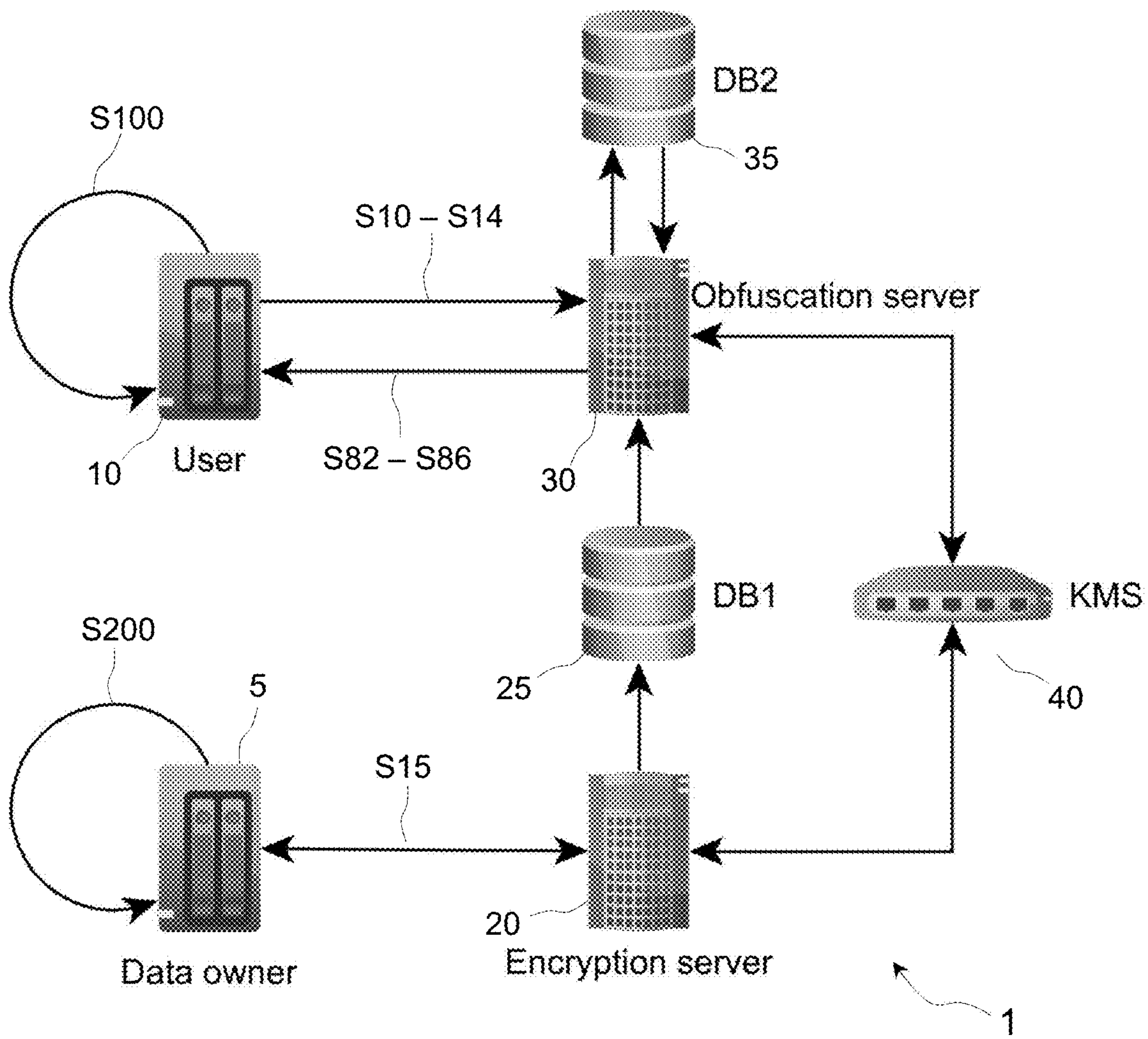
FIG. 1 schematically represents selected components of a system according to embodiments.
Figure 2:
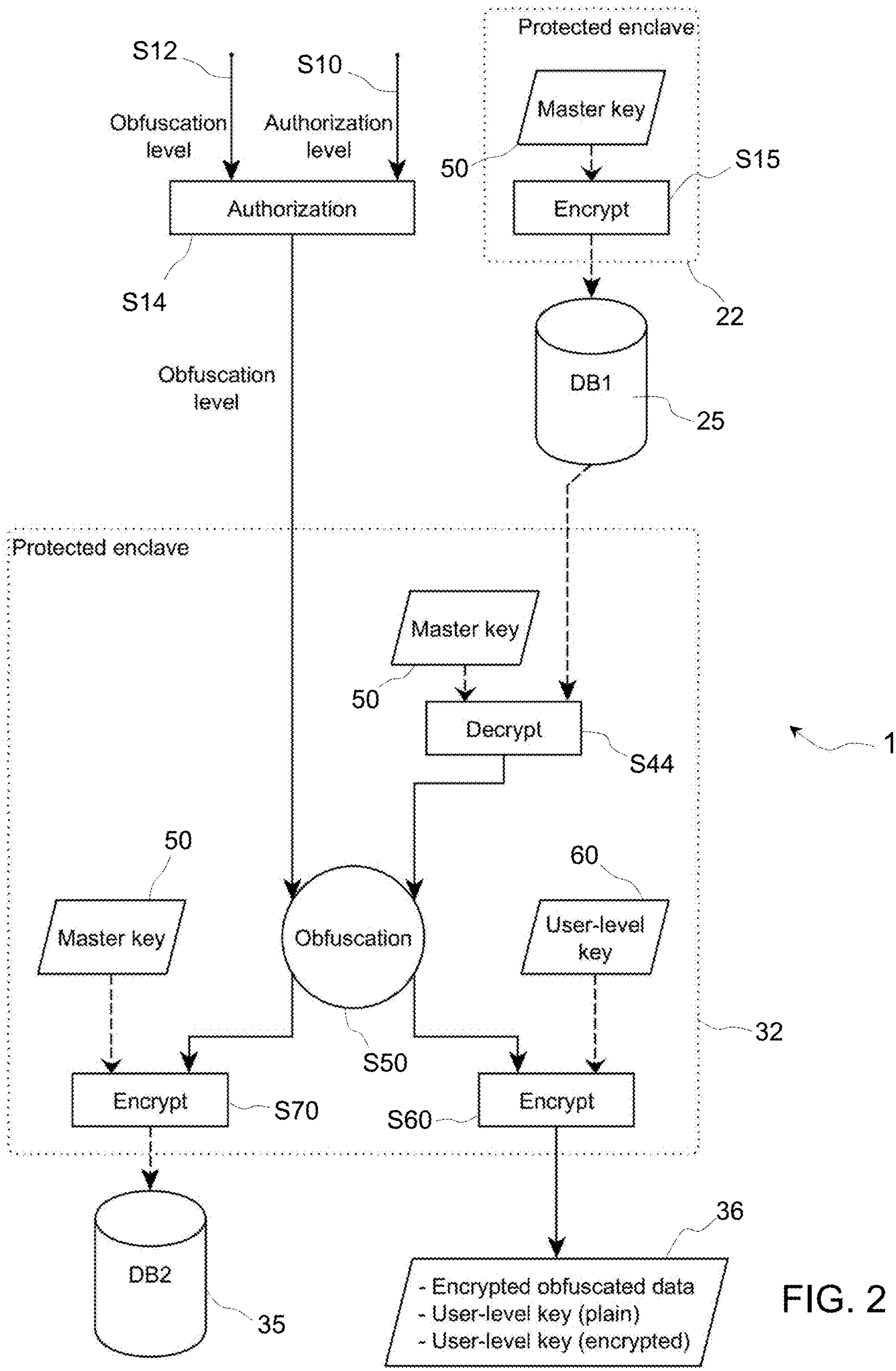
FIG. 2 is a diagram depicted selected components of the system, together with basic operations performed in the system, as in embodiments.
Figure 3:
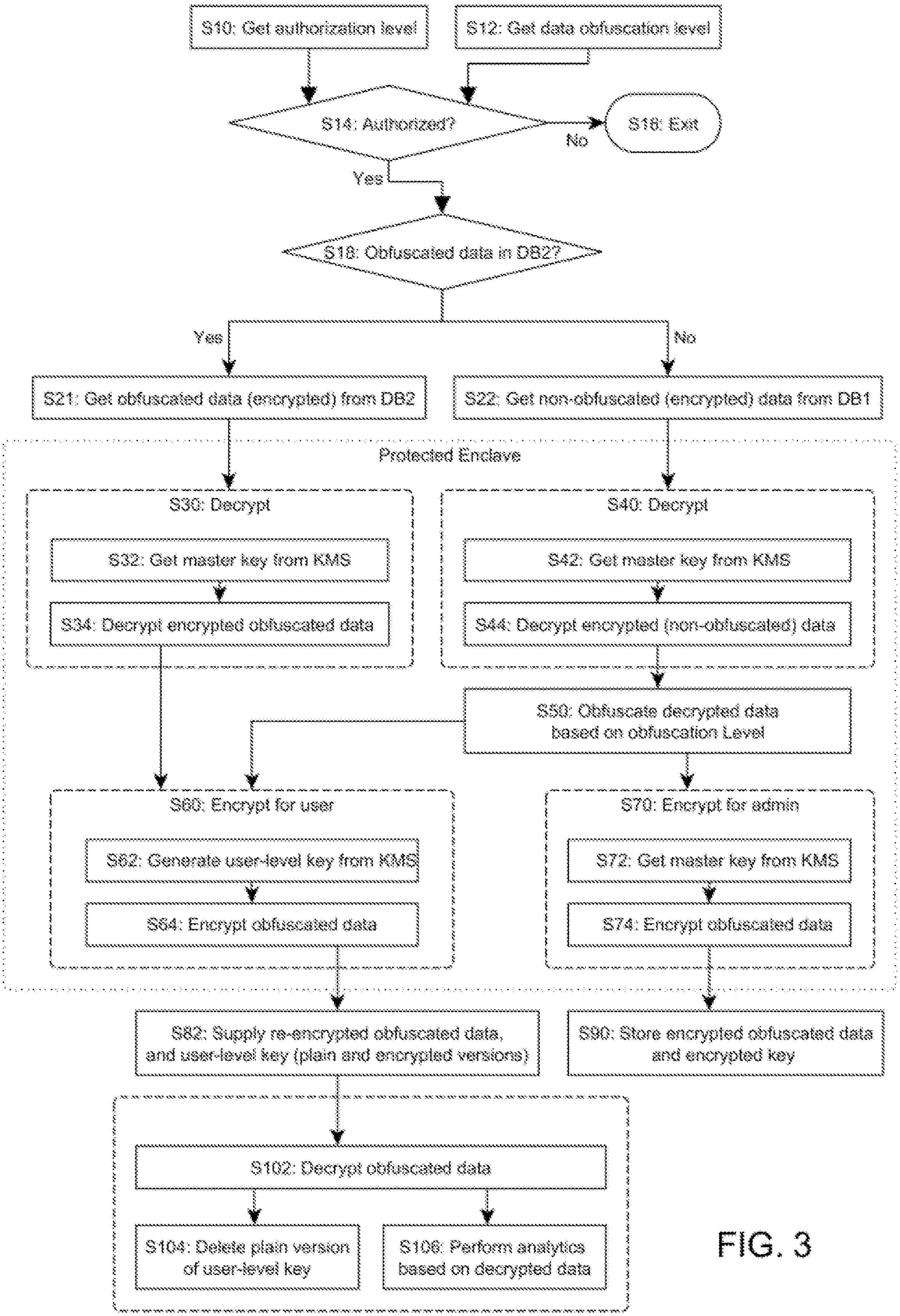
FIG. 3 is a detailed flowchart illustrating steps of a preferred method for providing obfuscated data to users, according to embodiments.

Referring generally to FIGS. 1-3, a first aspect of the invention is now described, which concerns a computer-implemented method for providing obfuscated data to users.

The following context is assumed, for the sake of exemplification. Data owners 5 store data they produce S200 or otherwise own on data storage means 25, which may for instance be configured as a data lake. Such data are typically stored encrypted, e.g., via an encryption server 20. Besides, some users 10 may want to perform analytics on such data. To that aim, users 10 interact with a server 30, which forms part of a computerized ecosystem 1 as shown in FIG. 1. Note, such users can be any entity (human, legal, and/or computerized, e.g., an automated process). However, in all cases, the user requests are mediated via a computerized entity. That is, computerized interactions are assumed.

What the present methods propose is to handle requests from users 10 based on authorization levels of the users. In response to such requests, data are supplied to the user in obfuscated form (i.e., altered), wherein the level of obfuscation of the data provided depends on the authorization levels of the users. In the present context, obfuscation means altering the original data, so as not to retain all of the information contained in the original data. I.e., the original information is at least partly lost, so as to potentially comply with various requirements, such as originating from authorizations set by the owners, privacy law, and regulatory needs, for example. Note, data provided back to the users 10 are never intended to infringe or circumvent any legal provision.

In detail, assume that a request S10, S12 to access data from is received from a user 10, e.g., at a request processing module implemented in a server 30. An authorization level associated with the request is then identified S10, in order to take steps to serve this request (if possible). Note, this authorization level may be identified upon receiving the request, or as part of the request itself, or even before receiving the request. Any authentication mechanism may be contemplated.

Next, obfuscated data are accessed S30-S50 in a protected enclave 32, which data are data corresponding to data addressed in the request received. The data accessed are data that are or have been obfuscated S50 with a suitable obfuscation algorithm. I.e., this algorithm must yield a level of obfuscation that is compatible S12, S14 with the authorization level identified S10 earlier. Thus, a core principle of the present methods is to link data access authorization to the strength of the data obfuscating algorithm used to obfuscate the data. Examples of obfuscation algorithms are discussed later.

Finally, the obfuscated data accessed at steps S30-S50 are provided S82 from the protected enclave 32 to the requesting user 10. After having received S82 the obfuscated data 36, users 10 may at S102 decrypt the obfuscated data, at S104 delete the plain version of the user-level key, and at S106 perform analytics, analyses or any kind of cognitive operations based on the obfuscated data 36 provided at S82.

A protected enclave is a computerized area of restricted access. Such an enclave may, for example, simply consist of one or more private (and preferably encrypted) regions of the memory of a computerized system, e.g., allocated thanks to a set of central processing unit CPU instructions. I.e., such instructions allow user-level code to allocate private (and preferably encrypted) regions of memory, which are protected from processes run even at higher privilege levels. A secure boot server with memory encryption when used exclusively for a single application with strict access control and limited network visibility is an example of a protected enclave.

A protected enclave may further be configured so as to limit network access through this enclave. For example, a network enclave may be separated from its surrounding network so as to limit access thereto to selected entities, applications or services of the surrounding network. More generally, the specific resources of the protected enclave may be designed so as to restrict interactions with external entities or networks. Access may otherwise be restricted thanks to secure access control means, e.g., including dedicated resources such as internal firewalls, and network admissions control means.

The protected enclave may notably be implemented as a virtualized, pre-integrated service-oriented architecture (SOA) platform. Still, this platform may possibly host trusted applications and allow them to interact with users and other external systems, though in a controlled and secure manner.

In general, any protected enclave as used herein may be implemented in hardware (e.g., secure boot server with exclusive use) or in software (e.g., based on Intel Software Guard Extensions SGX), or zSeries Secure Service Containers (SSC), for example.

In the present case, all sensitive operations (starting with the obfuscation step S50) are performed in a protected enclave. This way, security can be maintained in an ecosystem where numerous users may interact with a vast amount of data, whose access is subject to various types and levels of authorizations.

In simple implementations, a user 10 requests S12 to access data at a given level of obfuscation. The authorization level associated with the request (i.e., the authorization level of the user) is identified S10 (prior to or after identifying S10 the level of obfuscation desired), as assumed in FIG. 3. And if the given level of obfuscation identified S10 is compatible with the authorization level identified S12, then obfuscated data are accessed S30-S50 as described earlier and supplied S82 to the user.

In other, more sophisticated implementations, the user may specify his/her goals (e.g., in terms of analytics to be performed on such data), in which case the system automatically selects a suitable algorithm, or a level of obfuscation produced by the algorithm, as discussed later in detail.

One may, by convention, define the authorization level such that the highest authorization level allows access to data having any level of obfuscation. E.g., similarly to privilege levels in the intel x86 instruction set, the authorization level may range from 0 (most privileged) to $n>0$, where n is less privileged than $n-1$, which is less privileged than $n-2$, etc. Thus, any resource available to level n would also be available to authorization levels 0 to n. The obfuscation level may thus similarly be coded from 0 (corresponding to a low level of alteration) to $m>1$ (corresponding to a higher level of alteration). Thus, given a data-obfuscation level 1 desired and a data access authorization level k identified for the requester, access to the requested data is only allowed if the authorization level is higher (in the sense of privilege) than or equal to the data-obfuscation level, i.e., if $1\leq k$. Thus, an authorized user having a high authorization level (e.g., a data owner) may typically access data having any level of obfuscation As data 36 eventually supplied S82 is obfuscated, all rights attached to the data supplied S82 can be respected, by taking into account the authorization level of the requester.

As present inventors have realized, the present approach makes it possible to allow users to perform analytics based on data massively available, e.g., in a data lake, while preserving data usage authorizations as stipulated by the data owners and/or complying with other requirements. All this is now described in detail, in reference to particular embodiments of the invention.

To start with, referring to FIG. 3, the present methods may further comprise encrypting S64 the obfuscated data accessed with a user key, in the protected enclave 32. Step S64 is carried out prior to providing S82 the obfuscated data to the user. The user key is provided (i.e., supplied) S82 to the user 10, in addition to the encrypted, obfuscated data. This way, all data 36 leaving the protected enclave is encrypted (except the user key), for security reasons; the user can nevertheless decrypt the data provided using the user key provided.

In embodiments, an encrypted version of the user key may further be provided S82 to the user 10 (from the protected enclave 32), in addition to a plain version of the key. This way, the user can first decrypt the data provided based on the (plain) user key provided, and then delete this key (for security reasons). Later on, if necessary, the user may nevertheless still request receiving the user key again (in plain form), by providing the encrypted version of the key (a symmetric encryption scheme is here contemplated).

The user key is a cryptographic key generated for the user, e.g., via a key management system (KMS). As seen in FIG. 1, the protected enclave 32 may for example be in data communication with a KMS 40. The latter may thus be relied on to generate S62 the user key, which is received in the protected enclave 32 and subsequently used to encrypt S64 the obfuscated data. The KMS may possibly be a hierarchical key management system (HKMS): the user key may for instance be a user-level key 60 that is generated at a given hierarchical level of the HKMS, according to methods known per se.

In embodiments, the protected enclave 32 is in data communication with a first database 25 (e.g., a data lake) storing non-obfuscated data, in encrypted form. In that case, encrypted data may first be obtained S22 from this database 25 and then be accessed in the protected enclave 32, wherein said encrypted data correspond to data as requested in the request received S10. Next, the encrypted data obtained S22 are decrypted S40, S42-S44 (still in the protected enclave 32), and the decrypted data are then obfuscated S50 using a suitably selected obfuscation algorithm. I.e., data are obfuscated on demand, from data arising from a secure storage 25. Again, the decryption process S40 may advantageously involve a KMS, i.e., the decryption S44 may first require accessing S42 a key (e.g., a master key 50) from the KMS.

As depicted in FIGS. 1 and 2, data may be continually produced S200 by data owners 5 and hence continually encrypted S15 (e.g., thanks to a dedicated server 20) and stored on the first database 25. Note, the encryption step S15 is preferably performed in a protected enclave 22 too, which does not necessarily correspond to the enclave 32 provided in the server 30. Rather, the enclave 22 may be provided in a dedicated encryption server 20, used to store owner data on the storage 25.

As evoked earlier, the first database 25 may for instance be configured as a data lake, i.e., a storage repository that holds a huge amount of raw or refined data in native format. A data lake typically relies on Hadoop-compatible object storage, according to which organization's data are loaded into a Hadoop platform. Then, business analytics and data-mining tools can possibly be applied to the data where it resides on the Hadoop cluster. However, data lakes can also be used effectively without incorporating Hadoop, depending on the needs and goals of the organization. More generally, a data lake is a large data pool in which the schema and data requirements are typically not defined until the data is queried.

In the present context, the data owners may for example specify the required obfuscation levels as a function of the trust levels of the data users. As a result, different users may possibly get access to the same data, but with different obfuscation levels. Such levels institute intermediate levels of accessibility between publicly available data and fully private data.

Still referring to FIGS. 1 and 3, the protected enclave 32 is preferably in data communication with a second database 35. The latter store data that have already been obfuscated S50 (e.g., in response to previous queries), in encrypted form. In that case, obfuscated data shall typically be accessed S30-S50 by first checking S18 whether the requested data are already available in the second database 35. If it is determined that the requested data are indeed already available in the database 35 (S18: Yes), then encrypted versions of such obfuscated data are obtained S21 from this database 35 (they are loaded in the protected enclave). The data obtained S21 are then decrypted S30, S32-S34 (e.g., by obtaining S32 a key from a KMS, e.g., a master key), and subsequently provided S60, S82 to the user 10. Else, if it is determined at step S18 that the requested data are not already available in the second database 35, the requested data are obtained from the first database 25 and decrypted, prior to being obfuscated and passed to the user, as described earlier.

In order to make the system more efficient, data that need be obfuscated S50 are then stored on the second database 35, effectively working as a cache, as seen in the flowchart of FIG. 3. That is, data that have been recently obfuscated S50 may first be encrypted S70, S72-S74 (in the protected enclave 32), using a management key (different from the user keys), and then stored S90 on the second database 35. Again, use can be made of keys provided by a KMS 40. I.e., the management key used to encrypt S74 the obfuscated data may be obtained S72 from a KMS, for use in the protected enclave 32. Once stored S90 on the second database, obfuscated data are readily available for subsequent, related queries (S10-S18: Yes, S21).

As assumed in FIG. 3, the request received S12 may already specify a given, desired level of obfuscation. In that case, obfuscated data are accessed S30-S50 only if the specified level of obfuscation is compatible (S14: Yes) with the authorization level identified at step S10. Otherwise, exit at S16.

In more sophisticated approaches, the request received may specify a goal to be achieved with the data referred to in the request (e.g., in terms of analytics). In that case, the system may automatically select the obfuscation algorithm at step S50 (in accordance with said goal) or access cached data that have previously been obfuscated with a suitable algorithm. In all cases, the system makes sure that the data accessed S30-S50 are data that have been obfuscated S50 with an obfuscation algorithm selected in accordance with said goal, provided that the resulting level of obfuscation is compatible with the authorization level identified.

The request received may notably specify a goal to be achieved in terms of analytics to be performed with such data and the obfuscation algorithm is selected in accordance with said goal. For example, the user may want to uncover trends from data range queries, counts, etc. In that case, the obfuscation produced may be equivalent to anonymized histograms/sketch-based counting schemes, etc.

In other approaches, the request received may specify the desired obfuscation algorithm itself. In that case, the obfuscated data accessed S30-S50 are obfuscated with the obfuscation algorithm specified, but the system selects a level of obfuscation produced by the algorithm, so as for this level to be compatible with the authorization level identified earlier (if not possible, an error message is returned). For example, a standard set of obfuscation algorithms may be available, in which case the user is invited to select a given algorithm.

Note, the user interface or program used to enable user queries may provide several options to users, including those mentioned above, whereby users may thus either select an obfuscation level, specify a goal or the obfuscation algorithm itself.

Such algorithms may notably include naive anonymization algorithms, K-anonymity algorithms, differential privacy algorithms, homomorphic-encryption property-preserving algorithms, data aggregation algorithms, and/or sampling algorithms, etc. All such algorithms modify the original information, in various ways and possibly with various intensities. I.e., various intermediate levels of accessibility may hence be provided. In all cases yet, access is only provided if the specified algorithm is compatible with the user access level.

Referring now more specifically to FIGS. 1 and 2, another aspect of the invention is now described, which concerns a computerized system 1. Essential aspects of such a system have already been implicitly described in reference to the present methods and are only briefly described in the following. Such a system 1 at least includes a request processing module, typically implemented in software at a server 30.

The system (e.g., the server 30) is otherwise designed to provide (i.e., form) a protected enclave 32, in hardware and/or software. In all cases, the request processing module is configured to perform steps as described earlier, i.e., receiving user requests to access data, identify authorization levels associated with such requests, and perform sensitive operations S30-S70 as discussed earlier. That is, the request processing module is adapted to obfuscate data (via the protected enclave 32) with one or more obfuscation algorithms, so as to provide different levels of obfuscation. This module is otherwise configured to access obfuscated data corresponding to user requests.

As discussed earlier, obfuscated data may possibly be cached. In all cases, however, the data are or must have been obfuscated with one or more of the obfuscation algorithms, so as to yield a level of obfuscation that is compatible with authorization levels identified for the users. Finally, the module provides, in response to user requests, obfuscated data as accessed via the protected enclave 32.

As discussed, the request processing module may further be configured to encrypt the obfuscated data with user keys, prior to passing user keys to users, in addition to encrypted obfuscated data. The system 1 may notably comprise (or be designed to communicate with) a KMS 40 adapted to generate such user keys, as well as any key needed by the system upon performing operations described earlier in reference to steps S30, S40, S60, and S70.

In addition, the system 1 shall preferably comprise a first database 25 (storing non-obfuscated data, in encrypted form), and a second database 35 storing already obfuscated data (in encrypted form), the latter serving as a cache.

Next, according to a final aspect, the invention can further be embodied as a computer program product for providing obfuscated data to users. The computer program product comprises a computer readable storage medium having program instructions embodied therewith. The program instructions are executable by one or more processors (e.g., of the server 30), to cause to implement steps as described earlier in reference to the present methods.

The present invention may accordingly be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made, and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computer-implemented method for providing obfuscated data to users, the method comprising receiving a request to access data from a user;

identifying an authorization level associated with the request received;

in a protected enclave, accessing obfuscated data corresponding to the request received, wherein the data accessed have been obfuscated with an obfuscation algorithm yielding a level of obfuscation that is compatible with the authorization level identified, and providing, from the protected enclave, the obfuscated data accessed to the user, wherein the protected enclave is in data communication with a first database storing non-obfuscated data, in encrypted form, and is in data communication with a second database storing obfuscated data, in encrypted form, wherein accessing the obfuscated data comprises, in the protected enclave, checking whether the data as requested in the request received is already available in the second database, if the data as requested in the request received is already available in the second database, then obtaining, from the second database, encrypted obfuscated data corresponding to the requested data, and decrypting the encrypted, obfuscated data obtained, so as to be able to subsequently provide the decrypted obfuscated data to the user, else, obtaining, from the first database, encrypted data corresponding to data as requested in the request received, decrypting the encrypted data obtained, and obfuscating the decrypted data using said obfuscation algorithm.

2. The method according to claim 1, wherein the method further comprises prior to providing the obfuscated data, encrypting the obfuscated data accessed with a user key, in the protected enclave, and providing the user key to the user, in addition to the encrypted obfuscated data.

3. The method according to claim 2, wherein the method further comprises providing, from the protected enclave, an encrypted version of the user key to the user, in addition to a plain version of the user key.

4. The method according to claim 2, wherein the protected enclave is in data communication with a key management system and the method further comprises generating, at said key management system, the user key used to subsequently encrypt the obfuscated data.

5. The method according to claim 1, wherein the method further comprises continually encrypting data, in a protected enclave, and continually storing the resulting encrypted data on the first database.

6. The method according to claim 5, wherein the first database is a data lake.

7. The method according to claim 1, wherein the method further comprises encrypting, in the protected enclave, the obfuscated data with a management key, and storing the accordingly encrypted, obfuscated data on the second database.

8. The method according to claim 7, wherein the protected enclave is in data communication with a key management system and the method further comprises generating, at said key management system, the management key used to encrypt the obfuscated data.

9. The method according to claim 1, wherein the request received specifies a given level of obfuscation; and said obfuscated data are accessed only if said given level of obfuscation is compatible with the authorization level identified.

10. The method according to claim 1, wherein the request received further specifies a goal to be achieved with the data referred to in the request; and the obfuscated data accessed comprises data that has been obfuscated with an obfuscation algorithm selected in accordance with said goal, provided that the resulting level of obfuscation is compatible with the authorization level identified.

11. The method according to claim 1, wherein the request received further specifies an obfuscation algorithm; and the obfuscated data accessed comprises data obfuscated with the obfuscation algorithm specified, and the method further comprises selecting the level of obfuscation produced by the algorithm, so as for this level of obfuscation to be compatible with the authorization level identified.

12. The method according to claim 1, wherein said obfuscation algorithm relies on one or more of: a naive anonymization, a K-anonymity, a differential privacy, a homomorphic-encryption, data aggregation, and data sampling.

13. The method according to claim 1, wherein the method further comprises, after having provided the obfuscated data accessed to the user, performing analytics based on the obfuscated data provided.

14. A computerized system comprising:

a request processing module;

a first database storing non-obfuscated data, in encrypted form;

a second database storing non-obfuscated data, in encrypted form; and a protected enclave, which is in data communication with the first database and with the second database, wherein the request processing module is configured to:

receive a user request to access data;

identify an authorization level associated with a user request received;

in response to the user request, cause the protected enclave to:

obfuscate data with one or more obfuscation algorithms, the one or more obfuscation algorithms yielding different levels of obfuscation, and access obfuscated data corresponding to a user request, wherein the data are obfuscated with one or more of the obfuscation algorithms, so as to yield a level of obfuscation that is compatible with an authorization level identified, wherein accessing the obfuscated data comprises:

checking whether the data as requested in the request received is already available in the second database, if the data as requested in the request received is already available in the second database, then obtaining, from the second database, encrypted obfuscated data corresponding to the requested data, and decrypting the encrypted obfuscated data obtained, so as to be able to subsequently provide the decrypted obfuscated data to the user, else, obtaining, from the first database, encrypted data corresponding to data as requested in the request received, decrypting the encrypted data obtained, and obfuscating the decrypted data using said obfuscation algorithm; and in response to the user request, provide to the user the obfuscated data accessed via the protected enclave.

15. The computerized system according to claim 14, wherein the request processing module is further configured to cause the protected enclave to encrypt obfuscated data that the protected enclave accesses with a user key, and to provide, in response to a user request, such a user key to the user in addition to encrypted obfuscated data.

16. The computerized system according to claim 15, wherein the system further comprises a key management system adapted to generate such a user key.

17. A computer program product for providing obfuscated data to users, the computer program product comprising a computer readable storage medium having program instructions embodied therewith, the program instructions executable by one or more processors, to cause said one or more processors to:

receive a request to access data from a user;

identify an authorization level associated with the request received;

via a protected enclave, access obfuscated data corresponding to the request received, wherein the data accessed have been obfuscated with an obfuscation algorithm yielding a level of obfuscation that is compatible with the authorization level identified, wherein accessing the obfuscated data comprises checking whether the data as requested in the request received is already available in the second database, if the data as requested in the request received is already available in the second database, then obtaining, from the second database, encrypted obfuscated data corresponding to the requested data, and decrypting the encrypted, obfuscated data obtained, so as to be able to subsequently provide the decrypted obfuscated data to the user, else, obtaining, from the first database, encrypted data corresponding to data as requested in the request received, decrypting the encrypted data obtained, and obfuscating the decrypted data using said obfuscation algorithm; and provide, from the protected enclave, the obfuscated data accessed to the user.

* * * * *